United States Patent
Kim et al.

(10) Patent No.: US 11,456,846 B2
(45) Date of Patent: Sep. 27, 2022

(54) METHOD FOR PERFORMING SELF-INTERFERENCE CANCELLATION BY COMMUNICATION DEVICE OF DISTRIBUTED ANTENNA STRUCTURE

(71) Applicant: LG ELECTRONICS INC., Seoul (KR)

(72) Inventors: Dongkyu Kim, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 16/961,232

(22) PCT Filed: Jan. 15, 2018

(86) PCT No.: PCT/KR2018/000693
§ 371 (c)(1),
(2) Date: Jul. 9, 2020

(87) PCT Pub. No.: WO2019/139195
PCT Pub. Date: Jul. 18, 2019

(65) Prior Publication Data
US 2021/0067307 A1     Mar. 4, 2021

(51) Int. Cl.
*H04L 5/14* (2006.01)
*H04L 5/00* (2006.01)
(Continued)

(52) U.S. Cl.
CPC ............. *H04L 5/14* (2013.01); *H04B 7/0404* (2013.01); *H04B 15/02* (2013.01); *H04L 5/0048* (2013.01); *H04W 72/042* (2013.01)

(58) Field of Classification Search
CPC ...... H04B 17/345; H04B 1/56; H04B 17/309; H04B 7/26; H04B 15/00; H04B 1/1027;
(Continued)

(56) References Cited

U.S. PATENT DOCUMENTS

| | | | |
|---|---|---|---|
| 9,755,692 B2 | 9/2017 | Choi et al. | |
| 2015/0236750 A1* | 8/2015 | Choi | H04B 15/00 370/278 |

(Continued)

FOREIGN PATENT DOCUMENTS

| | | |
|---|---|---|
| WO | 2017/043731 | 3/2017 |
| WO | 2017/159930 | 9/2017 |

OTHER PUBLICATIONS

PCT International Application No. PCT/KR2018/000693, International Search Report and Written Opinion dated Sep. 14, 2018, 21 pages.

(Continued)

*Primary Examiner* — Romani Ohri
(74) *Attorney, Agent, or Firm* — Lee, Hong, Degerman, Kang & Waimey PC

(57) ABSTRACT

A method for performing self-interference cancellation by a terminal may comprise the steps of: receiving RS configuration information for phase estimation of self-interference from a base station; when the terminal operates, with a distributed antenna structure, in a full duplex radio (FDR) mode or operates in a space division duplex (SDD) mode between panels, transmitting an RS on the basis of the RS configuration information; and performing phase estimation for self-interference between the panels on the basis of the RS. The terminal is capable of communicating with at least one of another terminal, a terminal related to an autonomous driving vehicle, a base station or a network.

15 Claims, 12 Drawing Sheets

(51) Int. Cl.
H04B 7/0404 (2017.01)
H04B 15/02 (2006.01)
H04W 72/04 (2009.01)

(58) Field of Classification Search
CPC ..... H04L 5/14; H04L 25/0328; H04L 5/0073; H04L 25/08; H04L 25/03006; H04W 72/082; H04W 28/0236; H04W 52/243; H04W 52/24; H04W 36/20
See application file for complete search history.

(56) References Cited

U.S. PATENT DOCUMENTS

| | | | |
|---|---|---|---|
| 2015/0244505 A1* | 8/2015 | Celebi | H04W 52/36 370/277 |
| 2016/0143013 A1 | 5/2016 | Kim et al. | |
| 2017/0085398 A1* | 3/2017 | Liu | H04B 1/525 |
| 2018/0054275 A1* | 2/2018 | Kimura | H04J 15/00 |
| 2018/0090844 A1* | 3/2018 | Suh | H01Q 1/243 |
| 2018/0212746 A1* | 7/2018 | Kazmi | H04L 1/1825 |
| 2018/0323848 A1* | 11/2018 | Mizusawa | H04W 16/28 |
| 2019/0045474 A1* | 2/2019 | Li | H04W 56/0045 |
| 2020/0221476 A1* | 7/2020 | Saito | H04L 25/0226 |

OTHER PUBLICATIONS

Molinaro et al., "5G roadmap for V2X services," 5G Initiative—"5G Roadmap" Working Group, IEEE Advancing Technology for Humanity, 5 pages.

* cited by examiner

METHOD FOR PERFORMING SELF-INTERFERENCE CANCELLATION BY COMMUNICATION DEVICE OF DISTRIBUTED ANTENNA STRUCTURE

CROSS-REFERENCE TO RELATED APPLICATIONS

This application is the National Stage filing under 35 U.S.C. 371 of International Application No. PCT/KR2018/000693, filed on Jan. 15, 2018, the contents of which are all hereby incorporated by reference herein in its entirety.

TECHNICAL FIELD

The present disclosure relates to wireless communication, and more particularly, to a method of performing self-interference cancellation in a communication device of a distributed antenna structure.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) that support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Task

One technical task of the present disclosure is to provide a method of performing self-interference cancellation in a user equipment of a distributed antenna structure.

Another technical task of the present disclosure is to provide a user equipment of a distributed antenna arrangement for performing self-interference cancellation.

The technical objects that can be achieved through the present disclosure are not limited to what has been particularly described hereinabove and other technical objects not described herein will be more clearly understood by persons skilled in the art from the following detailed description.

Technical Solutions

In one technical aspect of the present disclosure, provided herein is a method of performing self-interference cancellation in a user equipment, the method including receiving Reference Signal (RS) configuration information for phase estimation of self-interference from a base station, transmitting an RS based on the RS configuration information when the user equipment operates in an inter-panel Space Division Duplex (SDD) mode or an inter-panel Full Duplex Radio (FDR) mode with a distributed antenna structure, and performing phase estimation on inter-panel self-interference based on the RS.

If the user equipment operates in the inter-panel SDD or FDR mode with the distributed antenna structure and a scheduled MCS level of the user equipment is smaller than an MCS level threshold related to the RS or a scheduled bandwidth is smaller than a predefined bandwidth, the RS for the phase estimation on the inter-panel self-interference may be transmitted.

The method may include transmitting to the base station a request for the RS transmission of the user equipment for the phase estimation on the inter-panel self-interference and receiving control information indicating that the RS configuration information is valid from the base station, and the RS may be transmitted based on the RS configuration information and the control information.

The control information may further include information on a time or frequency location at which the RS configuration information is valid. The control information may be received via a Physical Downlink Control Channel (PDCCH) or a Physical Downlink Shared CHannel (PDSCH).

The performing the phase estimation may further include calculating at least one of a phase noise or a phase coefficient.

The phase noise may be calculated based on a phase change between adjacent time regions in which the RS is transmitted and the phase coefficient may be calculated based on a phase change between adjacent frequency regions in which the RS is transmitted.

The method may further include performing the self-interference cancellation based on the phase estimation. The self-interference cancellation may be performed in a baseband stage of the user equipment, and the self-interference cancellation may correspond to digital self-interference cancellation.

The RS configuration information may be received through RRC signaling.

The RS may include one of a DeModulation RS (DMRS), a Sounding Reference Signal (SRS), and a Phase Tracking-Reference Signal (PT-RS). The user equipment may conceptually include a vehicle.

In another technical aspect of the present disclosure, provided herein is a user equipment for performing self-interference cancellation, the user equipment including a receiver configured to receive Reference Signal (RS) configuration information for phase estimation on self-interference from a base station, a transmitter configured to transmit an RS based on the RS configuration information when the user equipment operates in an inter-panel Space Division Duplex (SDD) or Full Duplex Radio (FDR) mode with a distributed antenna structure, and a processor configured to perform phase estimation on inter-panel self-interference based on the RS.

If the user equipment operates in the inter-panel SDD or FDR mode with the distributed antenna structure and a scheduled MCS level of the user equipment is smaller than an MCS level threshold related to the RS or a scheduled bandwidth is smaller than a predefined bandwidth, the transmitter may be controlled to transmit the RS for the phase estimation on the inter-panel self-interference.

The transmitter may be configured to transmit a request message for transmitting the RS to the base station, the receiver may be configured to receive control information indicating that the RS configuration information is valid from the base station, and the transmitter may be configured to transmit the RS based on the RS configuration information and the control information.

Advantageous Effects

According to one embodiment of the present disclosure, by using the signaling of the present disclosure for performing self-interference cancellation utilizing an idle transmission module of a panel operating in a reception mode in a user equipment (including a vehicle) of a distributed antenna structure, self-interference cancellation can be performed more efficiently.

Effects obtainable from the present disclosure may be non-limited by the above mentioned effect. And, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

Figure 1:
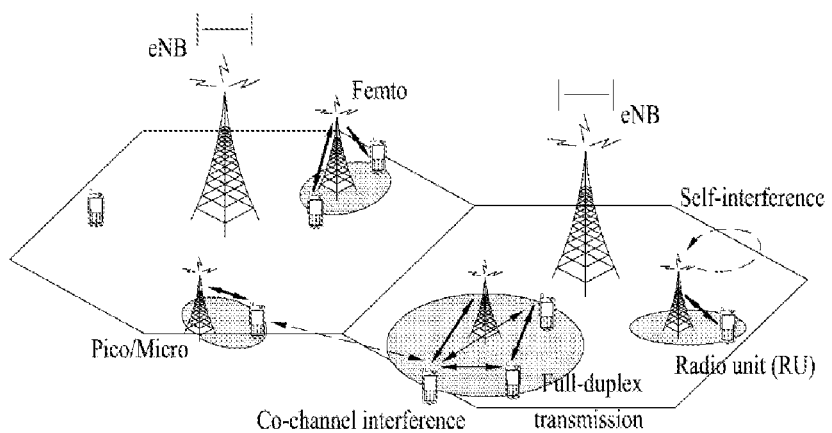
FIG. 1 is a diagram illustrating a network supporting a full-duplex/half-duplex communication operation scheme of a UE, which is proposed in the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

Figure 2:
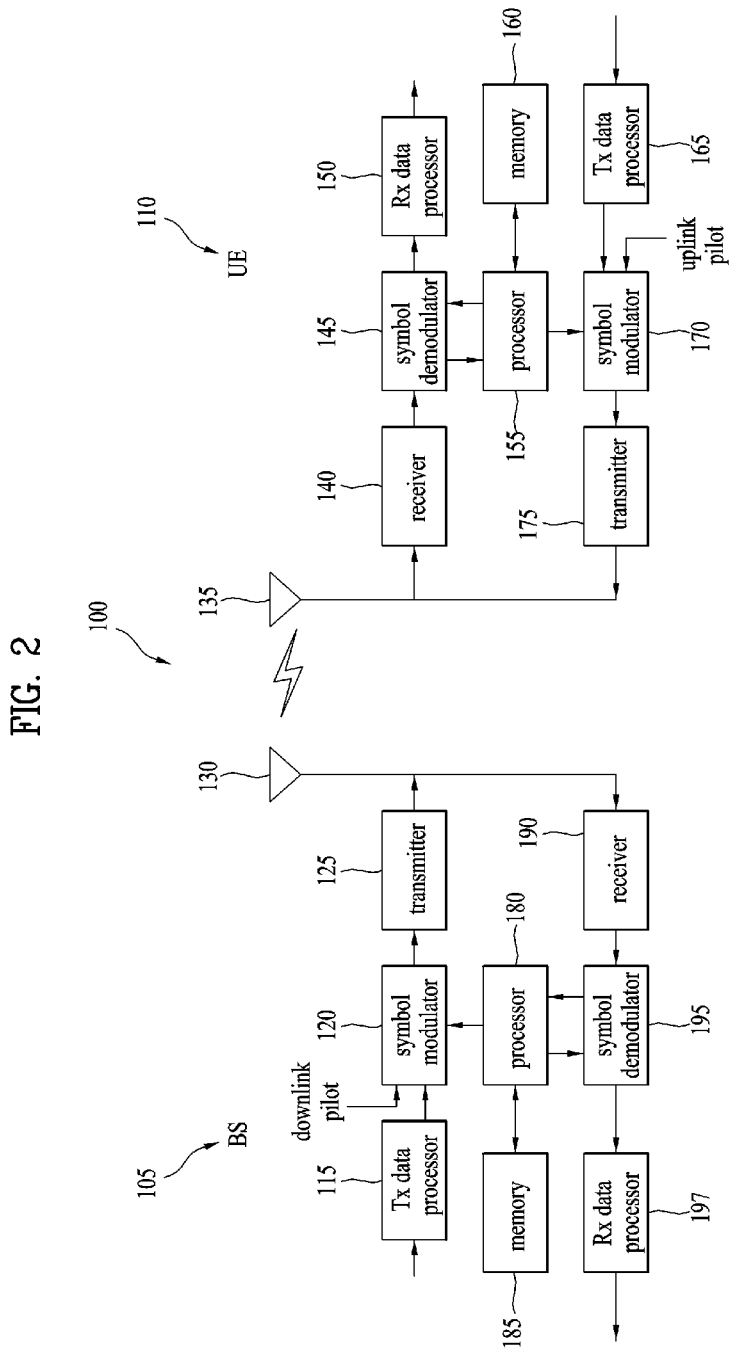
FIG. 2 is a block diagram of configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples.

The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
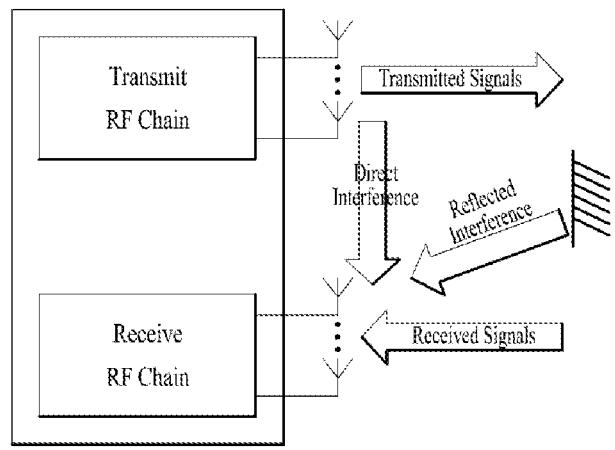
FIG. 3 is a diagram illustrating the concept of a transmission/reception link and self-interference (SI) in an FDR communication situation.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 1 below.

TABLE 1

| Node Type | Max. Tx Power (PA) | Thermal Noise. (BW = 20 MHz) | Receiver NF | Receiver Thermal Noise Level | Self-IC Target (PA-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm Self-IC performance. A thermal noise value may be changed as $N_{0,BW}=-174$ dBM+10×$\log_{10}$ (BW) according to a bandwidth of a mobile communication system. In Table 1, the thermal noise value is calculated on the assumption of a 20-MHz BW. Regarding Table 1, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
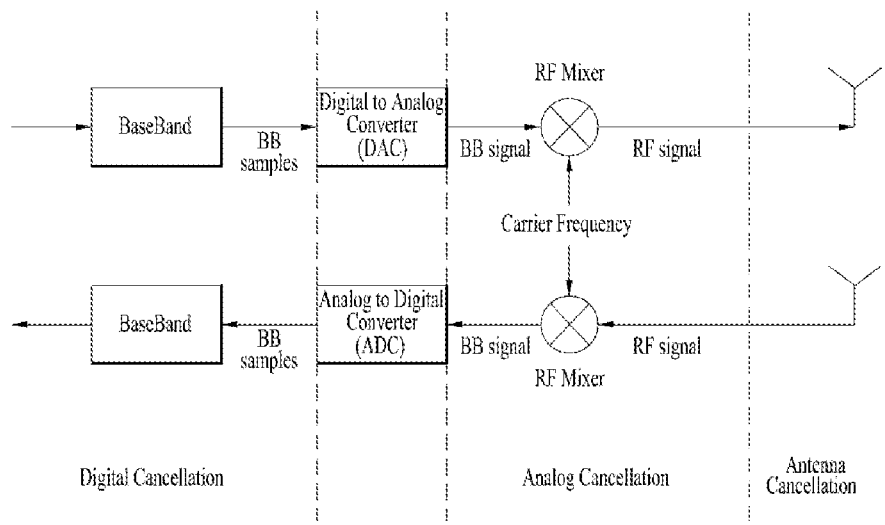
FIG. 4 is a diagram illustrating positions at which three Self-IC schemes are applied, in an RF Tx and Rx end (or an RF front end) of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
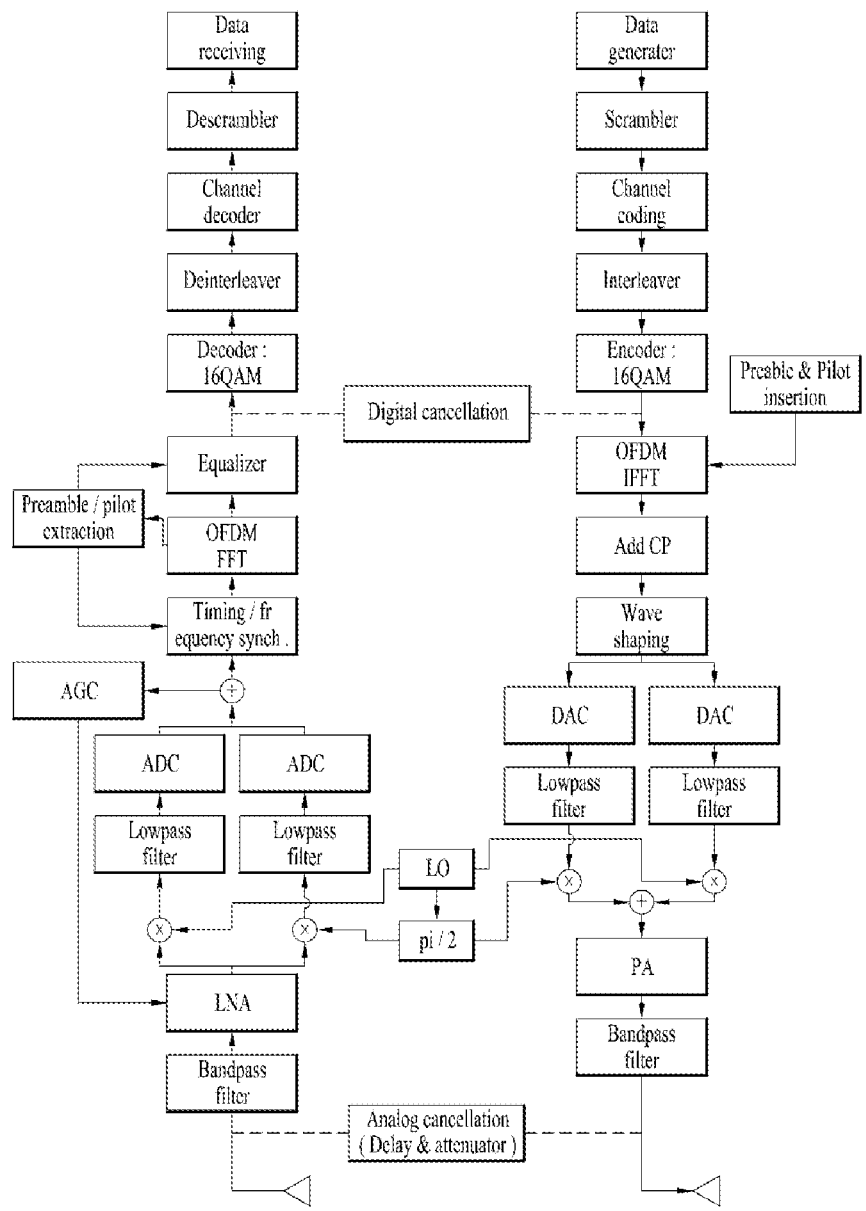
FIG. 5 is a block diagram of a Self-IC device in a proposed communication apparatus in an OFDM communication environment based on FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Hereinafter, the present disclosure is intended for self-interference cancellation in a UE (particularly, vehicle), and more particularly, suggests a method for performing self-interference cancellation by using an idle transmission module of a panel operating in a reception mode in a distributed antenna structure.

Space division duplex considered in the present disclosure is a scheme for independently managing a communication link of each antenna by performing space division for each antenna. In order to independently manage a communication link per antenna, self-interference between antennas owned by a UE should be removed, and interference between UEs included in a communication link should be reduced.

As a scheme for removing self-interference between antennas owned by a UE, there is an analog and digital self-interference cancellation scheme or a scheme for reducing self-interference by making sure of a distance between antennas. Since the scheme for reducing self-interference by making sure of a distance between antennas has lower complexity than that of the analog and digital self-interference cancellation scheme, the scheme for reducing self-interference by masking sure of a distance between antennas is easily applicable to the system. The scheme for reducing self-interference by masking sure of a distance between antennas may be applied by making sure of a distance between antennas in a vehicle UE larger than the existing communication UE. An inter-cell interference reduction scheme of the existing cellular communication system may be applied to the scheme for reducing interference between UEs. In current cellular communication at a high frequency band of 6 GHz or more, since a narrow beam width is formed for a communication distance, it is considered that the probability of interference due to overlapped beams of neighboring cells is low. Also, it is likely that a signal may be blocked by an object due to linearity of the signal. Since a vehicle has a surface made of iron and a big size, the vehicle is likely to block a high frequency signal of a neighboring UE.

Space division communication is easily applicable to high frequency communication between vehicles having distributed antennas due to the above characteristics. If space division communication is applied, since links of antennas are isolated from one another, transmission and reception timing points of the respective communication links may be allocated differently and frequency resources may be reused in each communication link.

Figure 6:
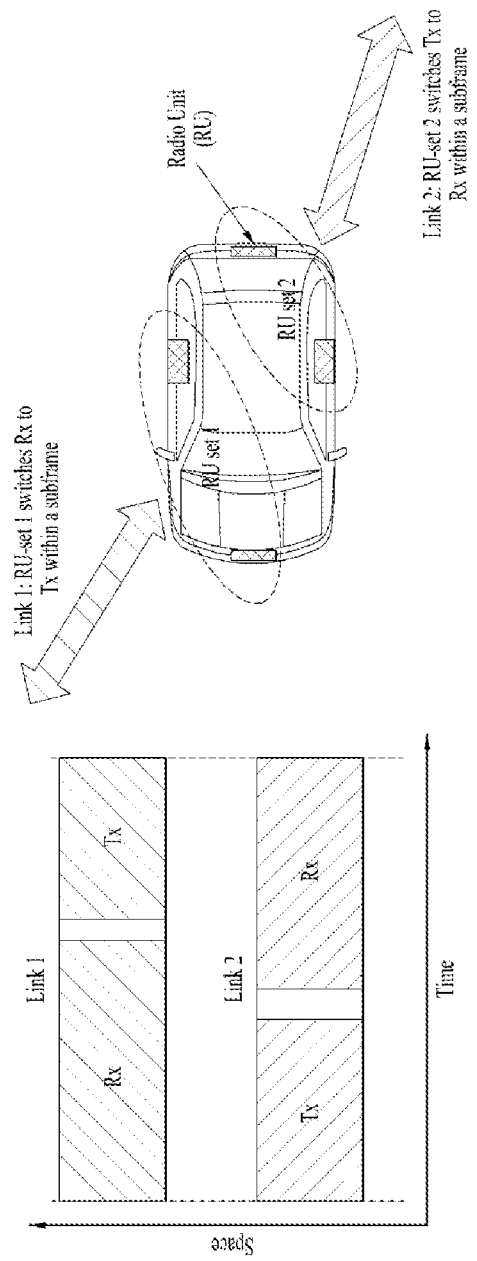
FIG. 6 is a diagram illustrating application of a spatial division communication (SDD) in a vehicle to which distributed antennas are applied.

FIG. 6 is a diagram illustrating application of a spatial division communication (SDD) in a vehicle to which distributed antennas are applied.

In FIG. 6, a link 1 and a link 2 are communication links connected with different devices (UE or base station). The amount of Tx resources and Rx resources may be changed depending on a status of each communication link, and Tx timing point and Rx timing point may also be changed. A radio unit (RU) shown in FIG. 6 is an antenna module that includes a plurality of antennas. In this case, a UE includes four RUs that are distributed. Two of four RUs are used to form the link 1, and the other two RUs are used to form the link 2.

Figure 7:
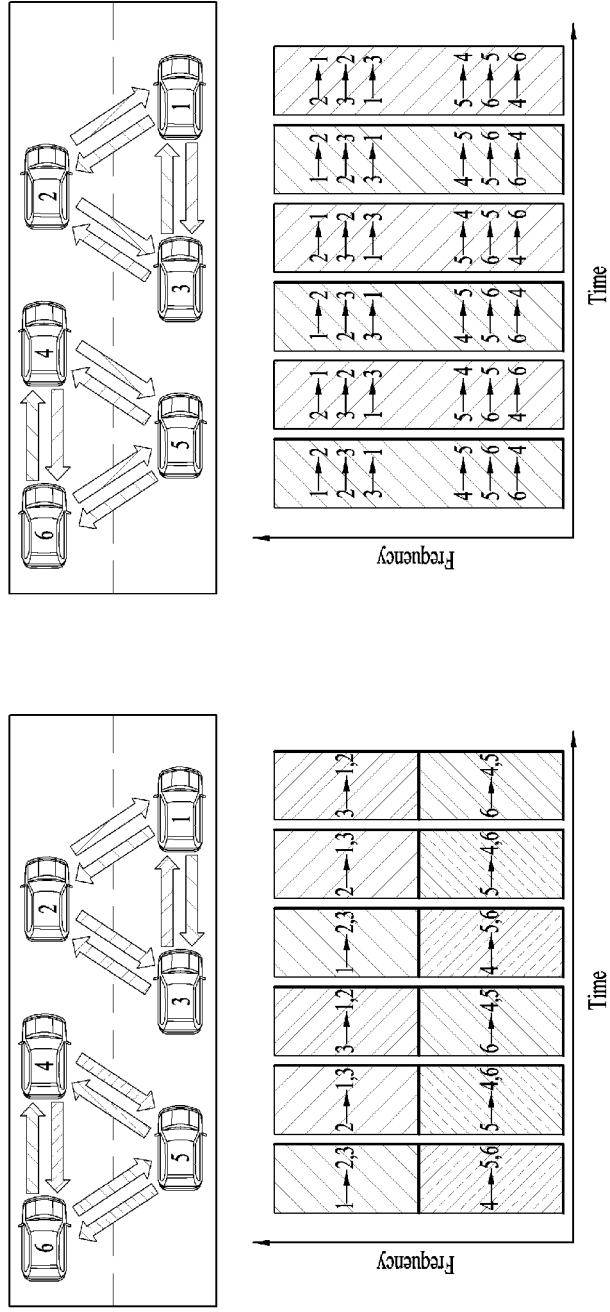
FIG. 7 is a diagram illustrating a comparison example of a case that SDD is not applied and a case that SDD is applied.

In the case that SDD is applied to a plurality of UEs, it is advantageous that transmission may be performed using more resources for more several times within a target time than the case that SDD is not applied to a plurality of UEs. FIG. 7 illustrates a comparison example of a case that SDD is not applied and a case that SDD is applied.

Referring to FIG. 7, a left drawing illustrates communication between vehicles to which SDD is not applied, and a right drawing illustrates communication between vehicles to which SDD is applied. In the case that SDD is not applied, the UE transmits a signal to different UEs in accordance with a multiplexing mode at the same time. If three UEs intend to form a communication link with their neighboring UE as shown in FIG. 7, each UE should be allocated with one transmission resource and two reception resources. If SDD is applied, the UE has only to form one transmission resource and one reception resource per communication link, the UE may perform signal transmission within a unit time for more times than the case that SDD is not applied. If SDD is applied, frequency resources are divisionally allocated to neighboring UEs that transmit signals simultaneously with the corresponding UE. If SDD is applied, since transmission signals of the respective UEs are spatially divided, the same frequency resource may be used, whereby frequency resources used by each communication link are increased.

In addition to the aforementioned advantages, since a reception UE of each communication link receives a signal by using narrow reception beams for space division, it is not likely that the UE is affected by jamming. In addition, since a neighboring vehicle is likely to block the signal, it is difficult to perform jamming at a long distance. As additional advantage, since a base station does not need to manage resources between communication groups to be orthogonal to resources in the communication groups, complexity in resource management of the base station is reduced.

In 3GPP TR 22.886, a scenario where 15840 vehicles exist per 1 mile is included. In this case, in order that a base station respectively manages communication links between respective vehicles, complexity of the base station is too increased. However, if SDD is applied, UEs included in the communication links have only to determine a transmission timing point and a reception timing point, complexity of the base station is reduced.

Figure 8:
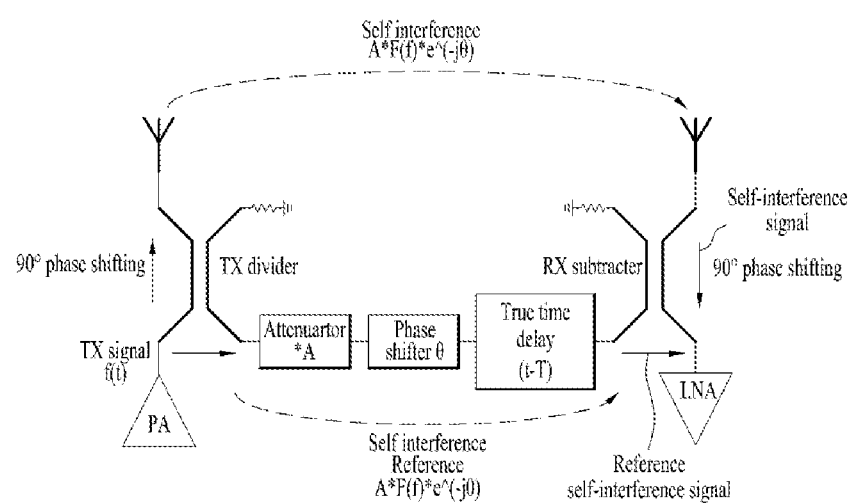
FIG. 8 is a diagram illustrating an example of an RF front-end structure of a communication device for analog self-interference cancellation.

FIG. 8 is a diagram illustrating an example of an RF front-end structure of a communication device for analog self-interference cancellation.

A basic principle in an analog domain is that a partial power of a transmission signal is diverged and then deformed to make a duplicate signal of a self-interference signal, which is actually received, and deduct the duplicate signal from a signal received in a reception antenna. In this case, several combinations of a true time delay, a phase shifter and an attenuator may be used to make a signal similar to the received self-interference signal from the diverged transmission signal.

However, it is physically difficult to transmit a signal to transmission panels, which are far away from each other, by diverging the signal from the transmission panels while minimizing distortion when SDD between panels is configured in a vehicle (operating in FDR mode) based on distributed antennas. When RF signal is transmitted between panels that are physically far away from each other, time delay due to transmission and signal attenuation occur, whereby it is apparent that signal distortion occurs. Therefore, when SDD between panels or FDR in a panel is configured in a vehicle based on distributed antennas, an approach different from a self-interference cancellation scheme of an analog domain in the existing UE or base station is required.

The present disclosure proposes a method of performing inter-panel self-interference cancellation using an idle transmission and reception RF chain existing in a corresponding panel when a specific panel operates in a reception mode in the structure of a distributed antenna. The transmission and reception RF chains exist in a pair-wise manner inside the panel of the distributed antenna. An RF chain of the transmission RF chain or the reception RF chain is selected by using a switch, and then connected to the antenna by the switch. When a specific panel operates in transmission/reception mode, there is an idle reception/transmission RF chain, which is not used, in the corresponding panel. The received inter-panel interference is diverged by activating the idle reception/transmission RF chain so as to come within the dynamic range of the ADC (in the case of using the reception RF chain), or it is possible to perform inter-panel self-interference cancellation in the analog domain by creating an RF signal capable of modeling inter-panel interference (in the case of using the transmission RF chain). The present disclosure is written by targeting a case of utilizing the transmission RF chain.

Suggestion 1

RF signal may be generated using an idle transmission RF chain of a reception panel from a signal transmitted from a baseband unit, and self-interference cancellation between distributed panels may be performed in an analog domain. If the idle transmission RF chain is used, RF signal for self-interference cancellation may be made even in an environment of distributed antennas. For convenience of description, it is assumed that two distributed units exist as described in the embodiment of FIG. 9.

Figure 9:
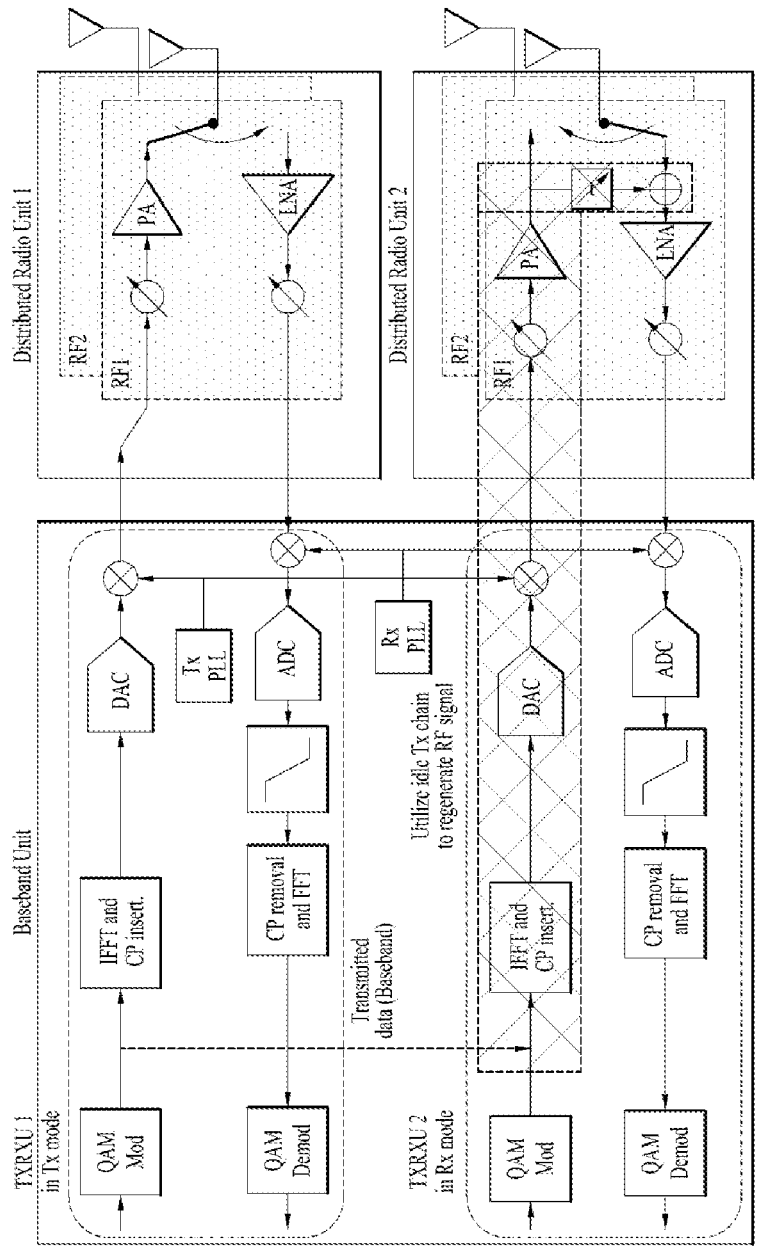
FIG. 9 is a diagram illustrating an example that RF self-interference cancellation is performed using a true time delay when two distributed antenna panels exist.

FIG. 9 is a diagram illustrating an example that RF self-interference cancellation is performed using a true time delay when two distributed antenna panels exist.

In FIG. 9, it may be assumed that a baseband unit is located inside a vehicle and distributed radio units (RUs) exist in several positions of the vehicle. For concept of SDD, it may be assumed that a distributed radio unit 1 (RU 1) is set to Tx mode and a distributed radio unit 2 (RU 2) is set to Rx mode. Cancellation of self-interference generated from the distributed RU 1 is required by the distributed RU 2. To this end, the idle transmission RF chain of the distributed RU 2 receives a baseband signal in the distributed RU 1 and then passes through several blocks of Tx chain like the distributed RU 1. Afterwards, the distributed RU 2 may naturally make a signal similar to the RF signal generated from the distributed RU.

A phase shifter and an attenuator already exist for analog beamforming (BF) in each antenna of the distributed RU. Therefore, two of three components required for analog self-interference cancellation already exist, and the distributed RU adds time delay between Tx chain and Rx chain to an analog self-interference cancellation circuit. Various types of adaptive algorithms may be used for a mechanism for controlling each of the phase shifter and the attenuator of analog self-interference cancellation.

Figure 10:
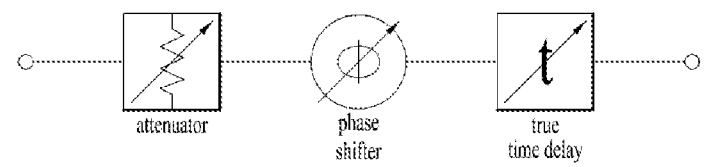
FIG. 10 is a diagram illustrating three components and effects in RF self-interference cancellation (SIC).
Figure 10:
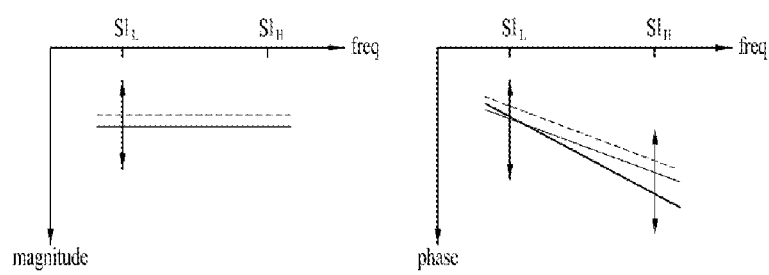

FIG. 10 is a diagram illustrating three components and effects in RF self-interference cancellation (SIC).

In FIG. 10, three components in RF SIC illustrate a self-interference cancellation effect. The attenuator vertically moves a magnitude of a signal, and the phase shifter vertically moves a phase of a signal. Finally, the true time delay varies a slope in a phase of a signal.

In the suggestion 1, a circuit of the true time delay is included in an mmWave band. However, it is difficult to make a true time delay normally operating in an mmWave band, and the true time delay is not a commercial device and therefore its cost may be expensive. Therefore, the following suggestion 2 intends to suggest a method for implementing an effect of a phase change, which occurs after passing through a true time delay, in a baseband.

Suggestion 2

A specific phase value per tone of transmission data transmitted from a baseband is previously compensated based on a channel estimation value of interference between patterns, an effect such as a phase change occurring after passing through the true time delay may be obtained when a self-interference signal is generated. RF signal may be generated using an idle transmission RF chain of a reception panel, and self-interference cancellation between distributed panels may be performed in an analog domain.

Figure 11:
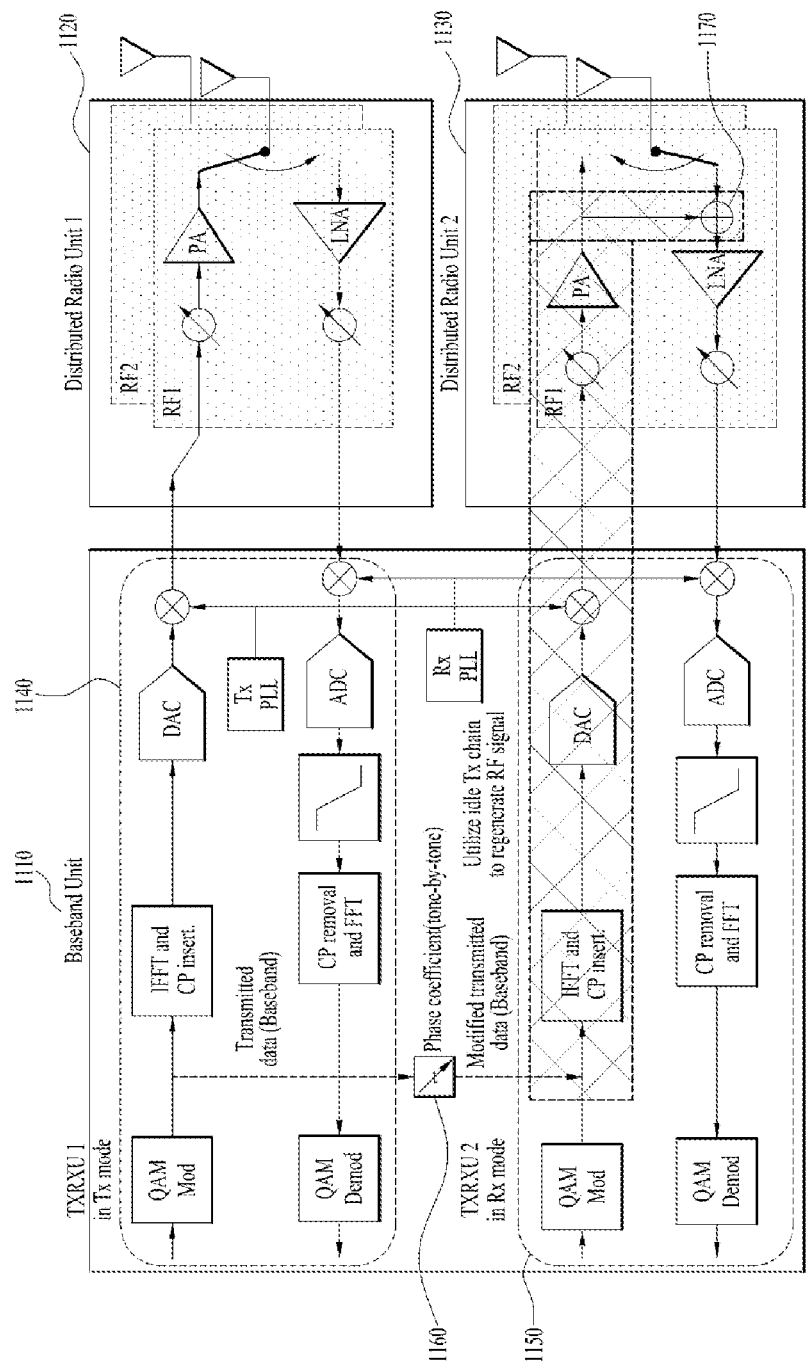
FIG. 11 is a diagram illustrating an example that RF SIC is performed using phase compensation in a baseband when two distributed antenna panels exist.

FIG. 11 is a diagram illustrating an example that RF SIC is performed using phase compensation in a baseband when two distributed antenna panels exist.

Since an idle transmission chain of a panel defined by Rx is used, a signal may be obtained from RF of the existing Tx chain and deformation for self-interference cancellation from the baseband may be performed without signal deformation.

Referring to FIG. 11, a communication device may include a baseband unit 1110, a first distributed RU 1120, and a second distributed RU 1130. The baseband unit 1110 may include a first transmission chain 1140 and a second transmission chain 1150. A processor may estimate a phase change, which occurs after passing through a time delay, through a pilot, and as shown in FIG. 11, a phase compensator 1160 in the baseband unit may previously compensate for the estimated phase coefficient value per tone with respect to a digital signal of a baseband, and may multiply a phase value, which is previously estimated and calculated, by each tone of data transmitted to obtain a phase distortion effect the same as the phase change occurring after passing through the time delay. A corresponding equation is as follows.

$$Y(s) = e^{j\Theta_s} * X(s), \text{ where } s = 1 \ldots N \quad \text{[Equation 1]}$$

That is, each tone may be multiplied by $e^{j\Theta_s}$ which is a previously calculated phase value, whereby an effect of the above true time delay may be obtained. In more detail, $e^{j\Theta_s}$ may be calculated by the following procedures:

1. $e^{j\Theta_{s1}}$: phase value per tone calculated by a fixed delay from an idle Tx chain to a coupler;
2. $e^{j\Theta_{s2}}$: phase value per tone calculated by a group delay of measured self-interference; and
3. $e^{j\Theta_s} = e^{j\Theta_{s2}} - e^{j\Theta_{s1}}$ As described above, since $e^{j\Theta_{s1}}$ which is a fixed delay of a device is previously calibrated and calculated, if $e^{j\Theta_{s2}}$ is obtained, $e^{j\Theta_s}$ may be calculated automatically. If is previously compensated by the baseband to generate a self-interference signal, the same effect as the true time delay may be obtained in the same manner as the suggestion 1, and a self-interference cancellation unit 1170 of the second distributed RU 1130 in the RF domain may cancel self-interference. The signal phase-compensated through the phase compensator 1160 is connected to the second Tx chain 1150, and is delivered from the second Tx chain 1150 to the second distributed RU 1130.

The self-interference cancellation unit 1170 may be a type of a coupler, and may cancel self-interference in such a way of deducting the signal delivered from the second Tx chain 1150 to the second distributed RU 1130 from the self-interference signal received by the second distributed RU 1130 through the phase compensated (or corrected) signal.

Suggestion 2-1

A phase offset value of each tone may be estimated and compensated by interpolation based on phase information of a complex value of a pilot that is previously defined.

The phase offset value to be compensated should be estimated for all tones. However, since it is almost impossible to estimate the phase offset value in commercial use due to high overhead, a phase value corresponding to the other tones should be estimated by a phase value estimated by a specific pilot. To this end, pilots (or tones and reference signals) for phase offset may be arranged uniformly, and the other values may be estimated by various methods (for example, linear interpolation method or various types of interpolation methods) to compensate for coefficient values of all tones.

Suggestion 3

In order to compensate for phase in a baseband and obtain a physical delay effect in a true time delay, a self-interference signal may be generated using a digital delay device, RF signal may be generated using an idle Tx RF chain of a reception panel, and self-interference cancellation between distributed panels may be performed in an analog domain.

Figure 12:
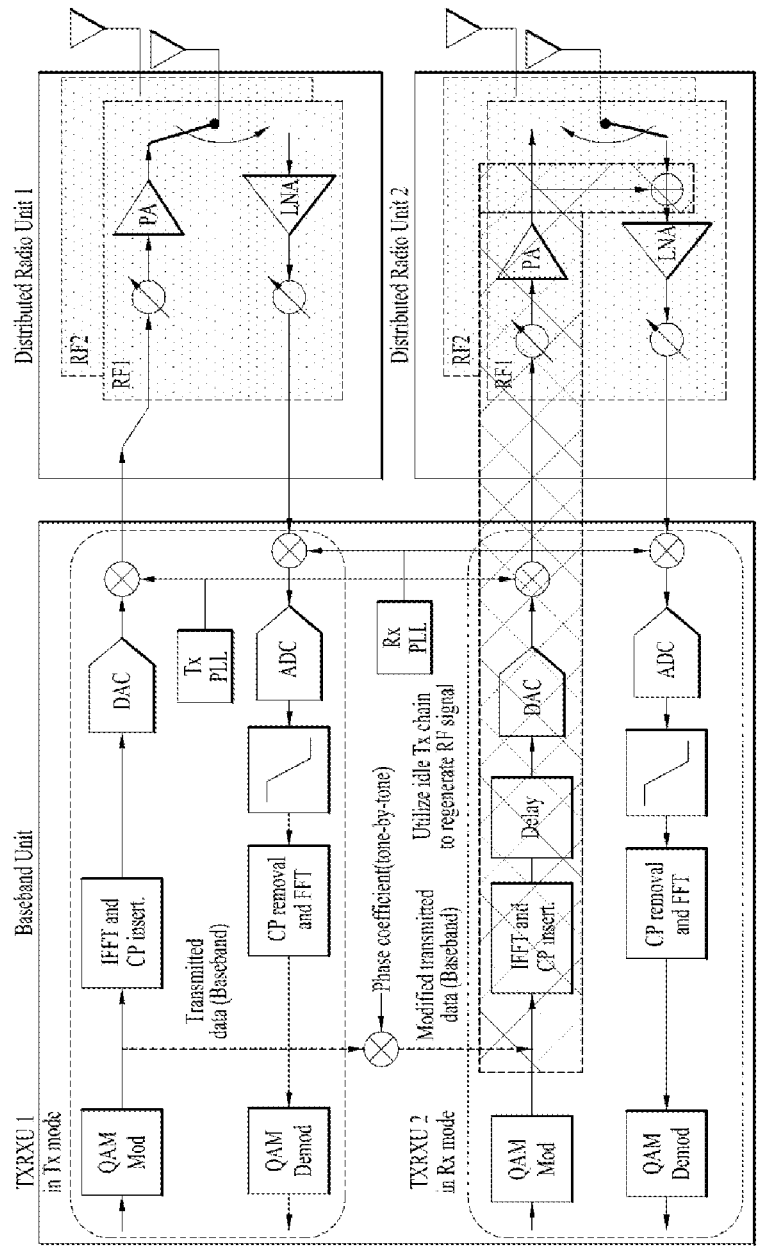
FIG. 12 is a diagram illustrating an example that RF SIC is performed using phase compensation in a baseband and a digital delay device when two distributed antenna panels exist.

FIG. 12 is a diagram illustrating an example that RF SIC is performed using phase compensation in a baseband and a digital delay device when two distributed antenna panels exist.

Even though a phase of a baseband signal has been compensated to be matched with estimated phase values of self-interference, time synchronization may not be actually matched by a physical time delay. In case of OFDM signal, if an error of time synchronization occurs within a cyclic prefix (CP), signal recovery is sufficiently possible even in an environment where a synchronization error is not compensated. However, if a self-interference signal is made beyond the CP, inter-symbol interference (ISI) is generated. To solve this, the time when the signal is made may physically be delayed using a digital delay device. This allows the signal to be recovered and removed within the CP. The suggestion 3 may be used together with the suggestion 2.

The suggestions described as above may selectively operate only when a BS or UE operates in FDR mode. The BS may operate in the FDR mode in the following cases: a UE operating in the FDR mode accesses the BS or a UE that desires downlink reception and a UE that desires uplink transmission desire to perform communication at the same time. In this case, the method may selectively operate. Generally, since downlink traffic is greater than uplink traffic, some of UEs that desire uplink transmission may operate in the FDR mode in order for a certain UE to operate in the FDR mode. In this case, the corresponding method may selectively operate.

For example, the BS may predict a duration of UE's FDR operation based on a buffer status report (BSR) and trigger UE's control signal transmission so as to receive necessary information from the UE through a physical layer signal or higher layer signal at a desired time.

Examples of the above-described suggested method may be considered as one method for implementing the present disclosure. Also, although the above-described suggested methods may be implemented independently, some of the above-described suggested methods may be implemented in the form of combination (or merge). A rule may be defined such that information on whether the suggested methods are applied (or information on rules related to the suggested methods) should be transmitted from a BS to a UE through a predefined signal (e.g., physical layer signal, higher layer signal, etc.).

Hereinafter, for self-interference cancellation using an RF in a user equipment (including a vehicle), a signaling method related to phase estimation necessary for performing self-interference cancellation by utilizing an idle transmission module of a panel operating in a reception mode in a distributed antenna structure will be described.

Figure 13:
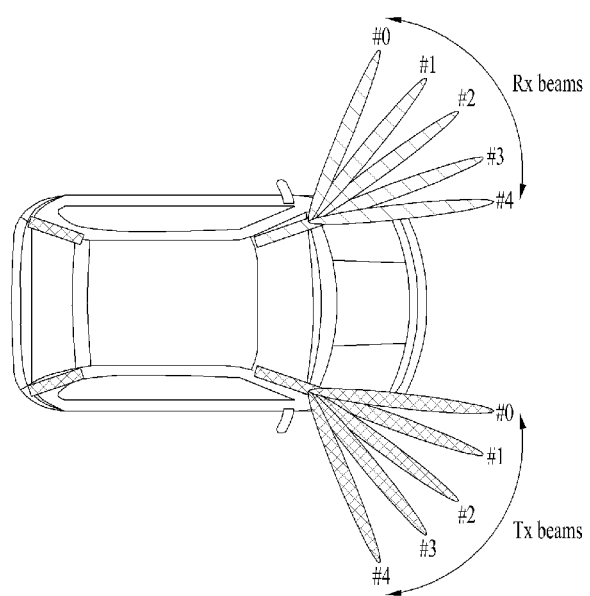
FIG. 13 is a diagram illustrating an example of inter-panel interference in which analog beamforming is considered.

FIG. 13 is a diagram illustrating an example of inter-panel interference in which analog beamforming is considered.

This example relates to a case in which interference occurs between a transmission panel and a reception panel in the same vehicle when vehicle-to-vehicle communication is performed using a distributed antenna in a vehicle. Analog beamforming may be applied to each panel, and it may be observed that inter-panel interference occurs according to an analog beamforming index.

As shown in FIG. 13, a right front A-filler side panel of a vehicle is defined as Tx and five analog Tx beams (indexes #0, #1, #2, #3, and #4) exist on this panel. A left front A-filler side panel is defined as Rx and there are 5 analog Rx beams (indexes #0, #1, #2, #3, and #4) on this panel. In such a case, total 25 pairs of inter-panel interferences by the beam indexes of each panel may be generated as follows.

(Tx beam index, Rx beam index)={(#0, #0), (#0, #1), (#0, #2), (#0, #3)(#0, #4), (#1, #0), (#1, #1), (#1, #2), (#1, #3)(#1, #4), (#2, #0), (#2, #1), (#2, #2), (#2, #3)(#2, #4), (#3, #0)(#3, #1)(#3, #2)(#3, #3)(#3, #4)(#4, #0)(#4, #1)(#4, #2)(#4, #3)(#4, #4)}

In FIG. 13, one transmission panel and one reception panel are illustrated as dispersedly disposed in a vehicle, but a plurality of transmission panels and a plurality of reception panels may be dispersedly disposed. In this case, the panel and the beam may be configured in a manner of being paired in consideration of self-interferences between Tx beams of each transmission panel and Rx beams of each reception panel.

In the distributed antenna environment, an inter-panel interference signal generated due to the reflector may change a phase slope due to a group delay of the signal. In order to remove it from the analog domain, it is necessary to compensate for a delay (i.e., phase slope). In the conventional sub-6 GHz, the delay is compensated for by using a true time delay element. However, it may be difficult to manufacture a true time delay in the mmWave band, and it may be replaced with baseband phase compensation and RF signal generation using an idle Tx chain, so that RF Self-Interference Cancellation (SIC) can be performed in the analog domain without the burden of additional hardware.

In order to compensate for a phase slope of an inter-panel interference signal in a distributed antenna environment, it is first necessary to estimate the phase slope on the baseband. That is, in order to compensate for phase coefficient on the baseband for the SIC in an RF domain by using a distributed antenna, it is necessary to estimate a phase slope or a phase distortion degree by a group delay. Hereinafter, a signaling method for phase estimation and compensation for phase coefficient compensation on a baseband will be described.

AGC control must be involved to prevent ADC saturation in the RF chain due to inter-panel interference received at large power by reflected interference due to interference reflecting from the reflector. That is, in estimating interference, not decoding a signal, the interference should be estimated by the AGC setting according to the received power of the interference. However, since AGC basically sets a gain value in accordance with a large signal, special setting is not required. Since interference cancellation is performed in an analog stage of a communication device at the time of performing the interference cancellation thereafter, if the interference cancellation is properly performed, the power of the reflected inter-panel interference is reduced, whereby a gain value of the AGC is also changed and comes within the rage of the ADC saturation.

In addition, in the distributed antenna environment, the same oscillator is shared between the Tx RF chain and the Rx RF chain, but phase noise occurs due to different transmission/reception times, and the communication device needs to estimate the phase noise through Phase Tracking-Reference Signal (PT-RS). That is, since a phase noise value at the time for a Tx signal to enter the RS RF chain is different from a phase noise value at the time for a signal to be generated from the Tx RF chain in the communication device, phase noise is inevitably present even if the oscillator is shared. Such a phase noise causes performance degradation when interference cancellation is performed.

In 5G NR, a Base Station (BS) may use RRC signaling when configuring PT-RS for a UE. In this case, the PT-RS may be in a state of being implicitly configured to be enabled only if a scheduled MCS level ($I_{MCS}$) of a UE/vehicle exceeds ptrs-MCS$_1$ or a scheduling bandwidth ($N_{RB}$) (number of RBs) exceeds $N_{RB0}$.

Here, the $N_{RB0}$ value is a threshold value set in advance by the BS, and this value can be overwritten through RRC in the future. The $N_{RB0}$ value may be a predetermined number of RB thresholds for determining whether or not the PT-RS is enabled for a UE that does not have a distributed antenna arrangement structure. And, the ptrs-MCS1 may be a prescribed threshold value of an MCS level related to the PT-RS. That is, the ptrs-MCS1 may be an MCS level threshold value for determining whether to enable the PT-RS for the UE that does not have the distributed antenna arrangement structure.

In case that there is SDD capability (or FDR capability) in a distributed antenna mounted vehicle, although a scheduled MCS level ($I_{MCS}$) of a UE/vehicle is smaller than ptrs-MCS1 or a scheduling bandwidth ($N_{RB}$) is smaller than $N_{BRO}$, since it is necessary to enable PT-RS) e.g., enabled by setting a UL-PTRS-present field, which is a higher layer parameter, to 'PN'), the vehicle may make a request for the PT-RS to the BS and the BS may need to explicitly configure the PT-RS for the vehicle.

Alternatively, when a UE (including a vehicle) operates in FDR/SDD mode (e.g., a case that a BS simultaneously allocates resources (DL & UL, DL & Side Link (SL), UL & SL, or SL & SL to the UE), the UE makes a request for PT-RS configuration to the BS as desiring to operate in FDR/SDD, or the UE is coupled with an enable field of the FDR/SDD mode of the UE/vehicle, ON/OFF operation of the PT-RS may be possible.

The following procedure is a procedure related to phase estimation, calculation and compensation. The detailed method is described as follows.

A UE makes a request for RS resource allocation for phase estimation of self-interference to a BS. Here, the RS for the phase estimation may include DM-RS, SRS, PT-RS, etc.

DM-RS: A UE may estimate a phase value using DM-RS for transmitting data. In addition, the UE may make a request for an additional DM-RS for more accurate phase estimation to the BS.

SRS: A UE can estimate a phase value using SRS for sounding. In addition, the UE can transmit a request for SRS transmission to a base station for phase estimation at a required time.

PT-RS: A UE can use PT-RS for phase noise estimation in case of high order modulation. However, in case of low order modulation, the UE can make a request for PT-RS to a base station for phase noise estimation.

Signaling for RS

RS configuration information such as additional DM-RS, SRS, PT-RS or the like for a UE to estimate a phase coefficient may be notified to the UE through predefined signaling (e.g., Radio Resource Control (RRC) signaling, Downlink Control Information (DCI), Physical Downlink Control Channel (PDCCH), etc.). Here, the RS configuration information may include information indicating a position of RS. For example, the RS configuration information may include periodicity information of RS, location or offset information of an RS located slot (or subframe), location or offset information of an RS located symbol, location or offset information of an RS located frequency, etc.

A base station may inform a UE through predefined signaling so that the UE can be aware of the pre-defined RS configuration information. This RS configuration information may be configured to be cell-specific, group-specific, or UE-specific. In addition, in case of 'group-specific', it means grouping a plurality of UEs, which may be a group of UEs in the same serving cell or a group of UEs in different cells. A method of grouping UEs may be based on location of UE, UE-to-UE channel, capability of UE (e.g., FDR capable, SDD capable, etc.).

In case that a UE makes a request for transmission of DM-RS, SRS, PT-RS or the like for phase estimation in inter-panel interference to a BS, the following implicit or explicit method may be possible.

Implicit Method:

A base station transmits RS configuration information to a UE through predefined signaling. The UE may implicitly know that the corresponding RS configuration information (or the corresponding RS configuration) is valid if a specific condition is satisfied. If this specific condition is satisfied, the UE performs a phase measurement of actual inter-panel interference. Here, the specific condition may include capability information of FDR or SDD of a vehicle or UE. In addition, the specific condition contain information indicating that interference cancellation of an RX chain is not performed properly, which can be known through presence of non-presence of ADC saturation.

Explicit Method

A base station may inform a UE that RS configuration information is valid through predefined signaling (e.g., existing DCI or new DCI), and instruct the UE to perform a phase measurement on the RS resource. The existing or new DCI may additionally include time and/or frequency location information in which the RS configuration information is valid. That is, it means that a valid RS among a plurality of RSs can be separately indicated. The base station may inform the UE of the instructions on PDCCH or PDSCH.

As one embodiment, a field indicating that the RS configuration information is valid may be added to an existing DCI. Table 2 below is a table showing values and corresponding descriptions of an RS configuration information field included in DCI.

TABLE 2

| RS configuration information field | Description |
| --- | --- |
| '0' | All configuration information (or RS) for phase coefficient estimation and phase noise estimation is not valid. |
| '1' | All configuration information (or RS) for phase coefficient estimation and phase noise estimation is valid. |

As another embodiment, a field indicating whether specific RS configuration information is valid and an RS configuration information field additionally indicating frequency location information coupled the former field may be added to an existing DCI. Table 3 below is a table showing values and corresponding descriptions of an RS configuration information field included in DCI.

TABLE 3

| RS configuration information field | Description |
|---|---|
| '00' | All configuration information (or RS) for phase coefficient estimation and phase noise estimation is not valid. |
| '01' | Configuration information (or RS) for phase coefficient estimation is valid but the rest configuration information (or RS) for phase noise estimation is unavailable. |
| '10' | Configuration information (or RS) for phase noise estimation is valid but the rest configuration information (or RS) for phase coefficient estimation is unavailable. |
| '11' | All configuration information (or RS) for phase coefficient estimation and phase noise estimation is valid. |

In Table 2 and Table 3, the field name added to the existing DCI is referred to as the RS configuration information field, but it may be called various other forms.

Phase Coefficient Calculation

In performing channel estimation, a UE may estimate a phase slope of self-interference with a phase difference between frequency regions (e.g., subcarrier(s) or Physical Resource Blocks (PRBs)) adjacent to each other among frequency regions (e.g., subcarrier(s) or Physical Resource Blocks (PRBs)) on which the RS is transmitted. However, in order to increase the accuracy of the phase slope estimation (for example, when estimation is required a plurality of times in a slot by mobility), the UE may make a request for configuration/transmission of additional DM-RS to a base station.

Phase Noise Calculation

A UE may estimate (or calculate) a phase noise of self-interference based on a phase change between time regions (e.g., adjacent symbol (or sampling time) units) adjacent to each other among time regions (e.g., adjacent symbol (or sampling time) units) in which the RS is transmitted.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method of performing self-interference cancellation in a UE of a distributed antenna structure is industrially applicable to various wireless communication systems such as a 5G communication system and the like.

What is claimed is:

1. A method of performing self-interference cancellation in a user equipment, the method comprising;
    receiving Reference Signal (RS) configuration information for phase estimation of self-interference from a base station;
    transmitting an RS based on the RS configuration information based on that the user equipment operates in an inter-panel Space Division Duplex (SDD) mode or an inter-panel Full Duplex Radio (FDR) mode with a distributed antenna structure;
    performing phase estimation on inter-panel self-interference based on the RS; and
    performing the self-interference cancellation based on the phase estimation,
    wherein the performing the phase estimation comprises calculating a phase coefficient, and
    wherein the phase coefficient is calculated based on a phase change between adjacent frequency regions in which the RS is transmitted.

2. The method of claim 1, wherein based on that the user equipment operates in the inter-panel SDD or FDR mode with the distributed antenna structure and a scheduled MCS level of the user equipment is smaller than an MCS level threshold related to the RS or a scheduled bandwidth is smaller than a predefined bandwidth, the RS for the phase estimation on the inter-panel self-interference is transmitted.

3. The method of claim 1, further comprising:
    transmitting to the base station a request for the RS transmission of the user equipment for the phase estimation on the inter-panel self-interference; and
    receiving control information indicating that the RS configuration information is valid from the base station,
    wherein the RS is transmitted based on the RS configuration information and the control information.

4. The method of claim 3, wherein the control information further comprises information on a time or frequency location at which the RS configuration information is valid.

5. The method of claim 1, wherein the performing the phase estimation further comprises calculating a phase noise.

6. The method of claim 5, wherein the phase noise is calculated based on a phase change between adjacent time regions in which the RS is transmitted.

7. The method of claim 1, wherein the self-interference cancellation is performed in a baseband stage of the user equipment.

8. The method of claim 3, wherein the control information is received via a Physical Downlink Control Channel (PDCCH) or a Physical Downlink Shared CHannel (PDSCH).

9. The method of claim 1, wherein the RS configuration information is received through RRC signaling.

10. The method of claim 1, wherein the RS comprises one of a DeModulation RS (DMRS), a Sounding Reference Signal (SRS), and a Phase Tracking-Reference Signal (PT-RS).

11. The method of claim 1, wherein the user equipment comprises a vehicle.

12. A user equipment for performing self-interference cancellation, the user equipment comprising:
- a receiver configured to receive Reference Signal (RS) configuration information for phase estimation on self-interference from a base station;
- a transmitter configured to transmit an RS based on the RS configuration information based on that the user equipment operates in an inter-panel Space Division Duplex (SDD) or Full Duplex Radio (FDR) mode with a distributed antenna structure; and
- a processor configured to perform phase estimation on inter-panel self-interference based on the RS and perform the self-interference cancellation based on the phase estimation,
- wherein the performing the phase estimation comprises calculating a phase coefficient, and
- wherein the phase coefficient is calculated based on a phase change between adjacent frequency regions in which the RS is transmitted.

13. The user equipment of claim 12, wherein based on that the user equipment operates in the inter-panel SDD or FDR mode with the distributed antenna structure and a scheduled MCS level of the user equipment is smaller than an MCS level threshold related to the RS or a scheduled bandwidth is smaller than a predefined bandwidth, the transmitter is controlled to transmit the RS for the phase estimation on the inter-panel self-interference.

14. The user equipment of claim 12, wherein the transmitter is configured to transmit a request message for transmitting the RS to the base station, wherein the receiver is configured to receive control information indicating that the RS configuration information is valid from the base station, and wherein the transmitter is configured to transmit the RS based on the RS configuration information and the control information.

15. The user equipment of claim 12, wherein the user equipment is capable of communicating with at least one of another user equipment, a user equipment related to an autonomous driving vehicle, a base station or a network.

* * * * *